June 24, 1958  E. H. HILL ET AL  2,840,678
RIVET MACHINE FEEDING MEANS
Filed Aug. 13, 1956  3 Sheets-Sheet 1
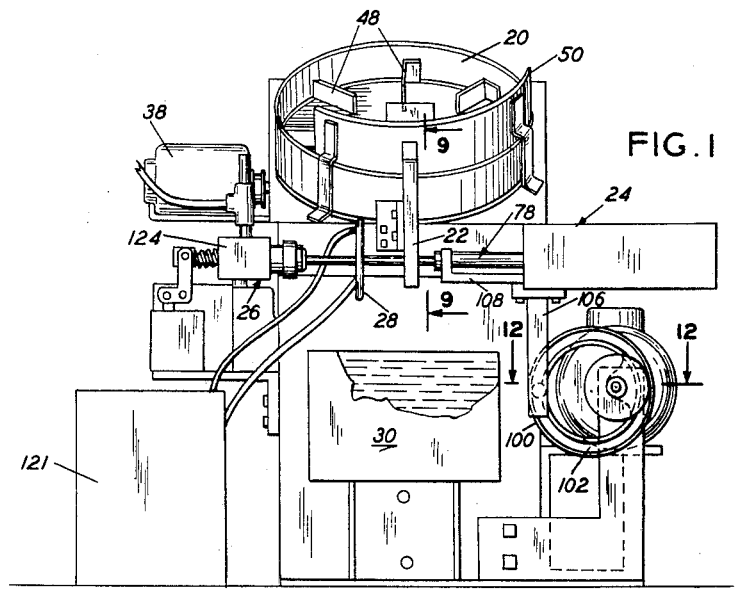
FIG. 1
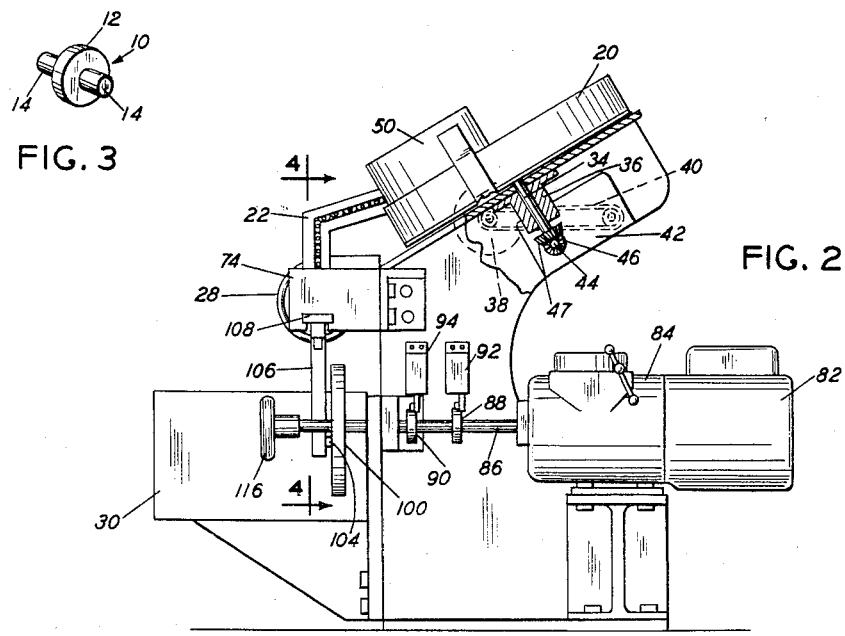
FIG. 3
FIG. 2
INVENTORS.
EMIL H. HILL
WILFRED O. ENGLAND
BY
Buckhorn, Cheatham & Blore
ATTORNEYS June 24, 1958  E. H. HILL ET AL  2,840,678
RIVET MACHINE FEEDING MEANS
Filed Aug. 13, 1956  3 Sheets-Sheet 2
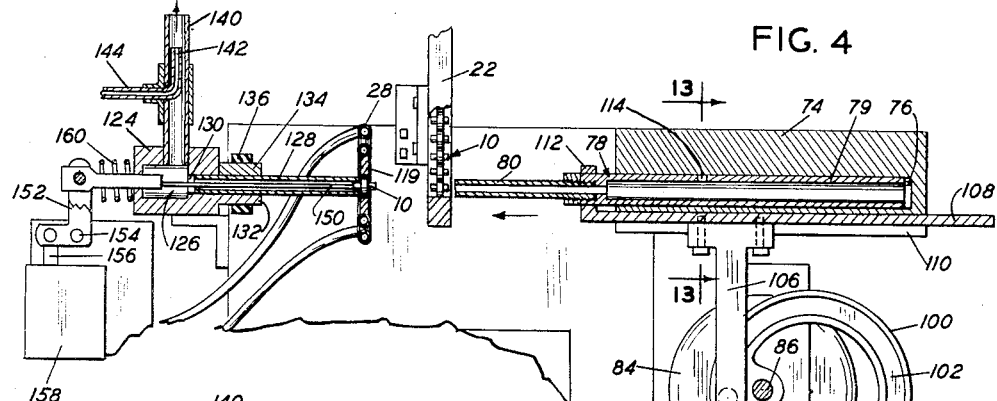
FIG. 4
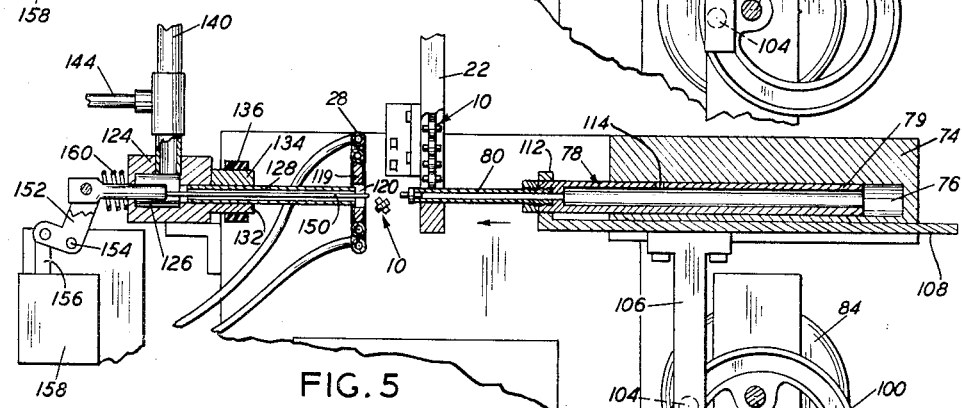
FIG. 5
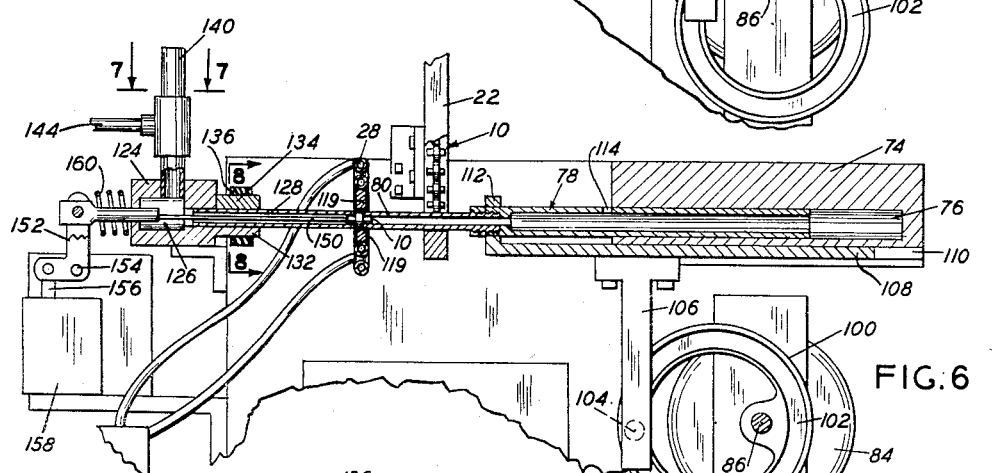
FIG. 6
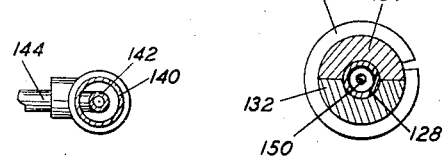
FIG. 7  FIG. 8
INVENTORS
EMIL H. HILL
WILFRED O. ENGLAND
BY
ATTORNEYS June 24, 1958 E. H. HILL ET AL 2,840,678
RIVET MACHINE FEEDING MEANS
Filed Aug. 13, 1956 3 Sheets-Sheet 3
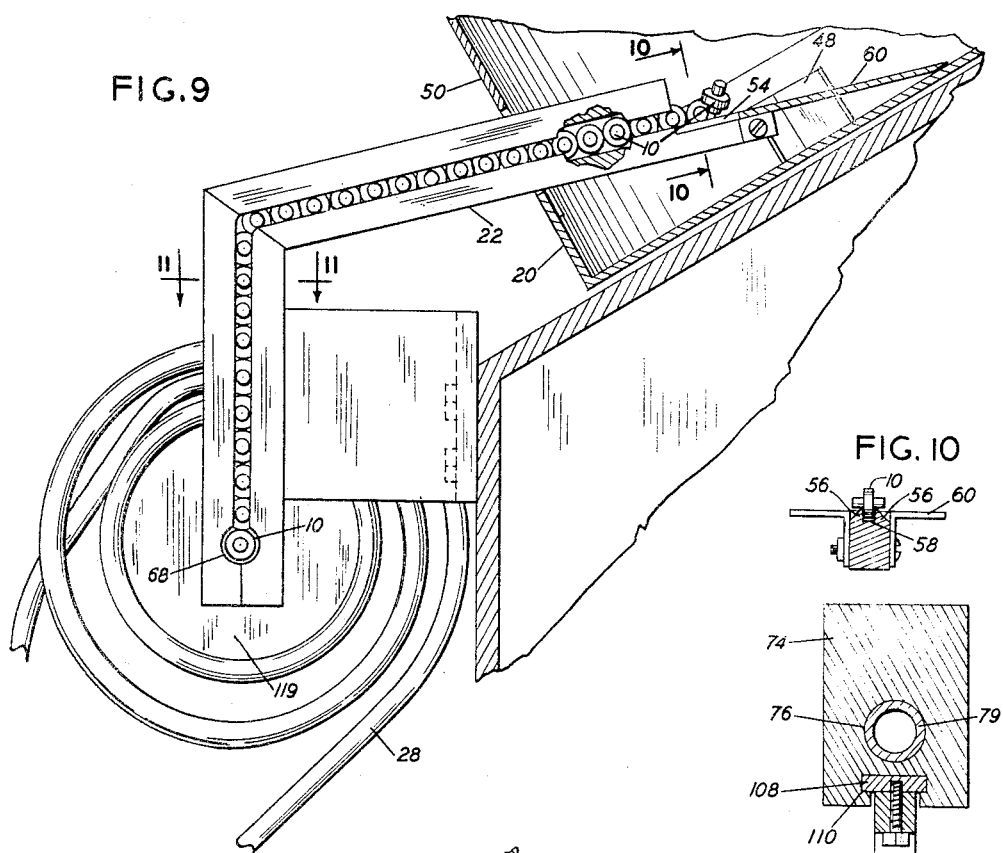
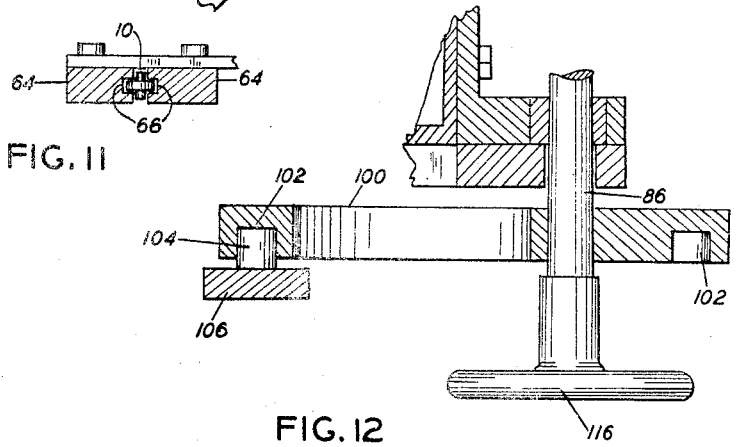
INVENTORS
EMIL H. HILL
WILFRED O. ENGLAND
BY
Buckhorn, Cheatham & Blore
ATTORNEYS United States Patent Office 2,840,678
Patented June 24, 1958

2,840,678
RIVET MACHINE FEEDING MEANS

Emil H. Hill and Wilfred O. England, Portland, Oreg., assignors to Omark Industries, Inc., a corporation of Oregon Application August 13, 1956, Serial No. 603,635

12 Claims. (Cl. 219—10.69)

The present invention relates to a machine for handling objects and more particularly it relates to a machine for heat treating small sized articles.

It is a primary object of the present invention to provide a new and improved machine capable of handling small articles or objects at a high rate of speed.

More particularly it is an object of the invention to provide a new and improved machine having means capable of rapidly taking articles one by one from a supply of the same and positioning them in a predetermined location.

A specific object of the invention is to provide a new and improved machine for heat treating the pivot pins of a power saw chain.

A further object is to provide a machine having a rapidly reciprocating member adapted to engage articles at one position and to move them to a predetermined location.

Another object is to provide new and improved means for engaging a small article at a predetermined location and transferring the article in predetermined orientation to a new location.

Still another object of the invention is to provide a new and improved arrangement for feeding a small article in predetermined orientation to a receiving member and transferring it from the feed member to the receiving member.

Other objects and advantages of the invention will become more apparent hereinafter.

The illustrated embodiment of the invention comprises a machine for heat treating pivot pins for connecting saw chain links, the machine including means for retaining a supply of the pivot pins and guiding the pivot pins from said supply to a predetermined location, means being provided for picking up the pivot pins positioned at said location one by one and carrying them into the aperture of a high frequency heating coil. A holding means is provided to seize a pivot pin from the last mentioned means and hold the pin within the aperture of the coil for a predetermined period of time, whereafter the pin is ejected from the coil and is permitted to fall into a coolant medium.

Further details of the invention will become more apparent from the following description thereof in conjunction with the accompanying drawings wherein:

Fig. 1 is a front, elevational view of a machine embodying the invention;

Fig. 2 is a side elevational view thereof;

Fig. 3 is an enlarged, perspective view of a pivot pin treated by the machine illustrated in the drawings;

Fig. 4 is an enlarged, sectional view of a portion of the machine taken substantially along line 4—4 of Fig. 2;

Fig. 5 is a view similar to Fig. 4 showing a further step in the sequence of operation of the machine;

Fig. 6 is another view similar to Fig. 4 showing a still further step in the sequence of operation of the machine;

Fig. 7 is a sectional view taken substantially along lines 7—7 of Fig. 6;

Fig. 8 is a sectional view taken along line 8—8 of Fig. 6;

Fig. 9 is an enlarged, sectional view taken substantially along line 9—9 of Fig. 1 showing certain details of the pivot pin supply means;

Fig. 10 is a sectional view taken along line 10—10 of Fig. 9;

Fig. 11 is a sectional view taken along line 11—11 of Fig. 9;

Fig. 12 is an enlarged, sectional view taken along line 12—12 of Fig. 1; and

Fig. 13 is an enlarged, sectional view taken along line 13—13 of Fig. 4.

Referring first to Fig. 3, the illustrated embodiment of the invention comprises a machine for heat treating pivot pins such as are used to secure together the links of a saw chain for a power chain saw, such pivot pins 10 comprising an enlarged, central collar 12 and oppositely projecting hubs 14 of lesser diameter than the collar. Referring to Fig. 1, the illustrated machine includes, in general, means for retaining a supply of pivot pins to be treated including a pan 20 into which a random supply of the pins may be placed and from which they automatically progress one by one, in a manner to be described, to a holder 22. Means indicated generally at 24 are provided for periodically transferring or feeding a pivot pin from the holder 22 to means indicated generally at 26 which receive and hold the pivot pin within the aperture of a high frequency heating coil 28 for a predetermined period of time, after which the pivot pins are ejected from the coil and permitted to fall into a container 30 of quenching coolant.

Describing the machine more specifically now, the pan 20 is rotatably supported on the frame of the machine by means of a shaft 34, see Fig. 2, journaled in a bearing 36. To rotate the pan a motor 38 is provided connected to the shaft 34 by suitable means including a belt 40 and a reduction speed gear box 42 having an output shaft 44 carrying a bevel gear 46 which meshes with a bevel gear 47 on the shaft 34. The pan is provided with a plurality of baffles 48 and is tilted forwardly as is clearly apparent in Figs. 1 and 2 so that as the pan is rotated, the supply of pivot pins therein will be carried upwardly by the baffles to the upper part of the pan where they fall free of the baffles and tumble downwardly toward the lower edge of the pan, a guard plate 50 being positioned adjacent the lower edge of the pan to prevent the pins from tumbling out. Referring to Figs. 9 to 11, extending into the pan over the lower edge thereof is a pick-up member 54 formed to define a pair of parallel shoulders 56 defining a groove 58 therebetween of a width slightly greater than the width of a pivot pin collar 12. The pick-up member 54 is inclined downwardly over the lower edge of the pan whereby pivot pins 10 tumbling over the pick-up member and falling thereon with the collar 12 engaged in the groove 58 will roll upon the pin hubs 14 downwardly of the member toward the lower edge of the pan. A plate 60 may be secured to the upper end of the pick-up member 54 to guide the tumbling pins toward the pick-up member. The pick-up member 54 is formed as an extension of the holder 22 which comprises a pair of opposed members 64 spaced apart a distance slightly greater than the diameter of the pin hubs 14, each of the members having a groove 66 for receiving the pivot pin collars 12, as best shown in Fig. 11. The pivot pins roll from the pick-up member 54 into the channel thus formed and are aligned in a row, as indicated in the various views of the drawings. At the lower end of holder 22, a transverse opening 68 is provided, the members 64 abutting on the lower side of the opening so as to support a pivot pin therein and the row in the channel above, as best shown in Fig. 9. The opening 68 is of a diameter slightly greater than that of the pivot pin collar 12.

Referring now more particularly to Figs. 4, 5 and 6, the feed means 24 comprises a block 74 defining a cylinder 76 in which is slidably mounted a feed member 78 in the form of a tubular piston including an enlarged portion 79 fitting within the cylinder and a smaller tubular extension 80 having an outer diameter substantially the same as the diameter of the pivot pin collar 12 and an inner diameter just slightly greater than the diameter of the pivot pin hubs 14, the extension 80 being in coaxial alignment with the opening 68 in the pivot pin holder 22. Means are provided for effecting reciprocation of the feed member 78, such means including a motor 82 connected through an adjustable speed gear box 84 to a shaft 86 on which is mounted a pair of cams 88, 90 for operating control switches 92, 94, the function of which will subsequently be described. Eccentrically mounted on the shaft 86 is a face cam 100 having a circular cam slot 102 adjacent the periphery thereof. Engaged in the cam slot 102 is a cam follower pin 104, see Fig. 12, which extends from the lower end of a crank arm 106 secured to a slide bar 108 which slides within a groove 110 formed in the block 74 beneath the cylinder 76, the slide bar being secured to the piston 78 by a bracket 112. As will be observed, rotation of the shaft 86 will cause the crank arm 106 to move transversely back and forth relative to the shaft 86 between the limit positions shown in Figs. 4 and 6, thus effecting reciprocation of the piston 78 within the cylinder 76. A hand wheel 116 may be provided on the shaft 86 to facilitate movement of the parts during adjustment and repair.

The feed member 78 is formed with a port 114 positioned so that it is exposed to admit air to the interior of the feed member when the feed member reaches its position of full extension as shown in Fig. 6.

The heating coil 28 is preferably formed of helically coiled copper tubing or similar material through which coolant may be circulated to prevent overheating of the coil, the coil being arranged in a vertical plane and having a heating block 119 formed with a circular aperture 120 in which a pivot pin 10 to be heated is positioned. The aperture 120 is in coaxial alignment with the opening 68 and feed member extension 80. The coil is connected to any suitable source of energy such as a conventional high frequency source indicated generally at 121 in Fig. 1. The switch 94 is connected by suitable means (not shown) so as to control the supply of energy to the coil 28 at desired predetermined periods.

The means for receiving and holding the rivets within the aperture 120 of the coil will now be described with particular reference again to Figs. 4, 5 and 6. Such means include a head block 124 suitably supported on the frame of the machine and having a chamber 126 formed therein. Extending from the block 124 in communication with the chamber 126 is a pivot pin support member comprising a ceramic tube 128 having an inner diameter just slightly greater than the diameter of the pivot pin hubs 14. The tube 128 is axially coincident with the feed member extensions 80 and the pivot pin holder opening 68 and terminates immediately adjacent the heating coil 28 so that a pivot pin held thereon will be positioned in the heating coil aperture 120. The tube 128 fits snugly within an opening 130 formed in the head block 124 and extends over a semi-circular supporting shelf 132 projecting from the head block 124 and formed with a semi-circular groove for receiving the tube. The tube 128 is clamped against the shelf 132 by means of a half-moon shaped clamping piece 134 and split resilient rubber ring 136 which surrounds the shelf 132 and clamping piece 134. Thus the tube 128 can be quickly and easily replaced in the event it cracks or chips by simply removing the clamping ring 136 and clamping piece 134 to permit withdrawing of the tube from the opening 130, whereafter a new tube can be mounted in place.

Means are provided for drawing a vacuum in the chamber 126 and the tube 128. The illustrated means comprises a jet pump including a pipe 140 communicating with the chamber 126 and opening to atmosphere. Extending into the pipe 140 and facing in a direction away from the chamber 126 is a jet nozzle 142 which may be connected to a source of air pressure by an air line 144. As is known, air blowing out of the jet nozzle 142 will suck air upwardly through the pipe 140 to draw air from the chamber 126.

Means are provided for ejecting a pivot pin from the end of the tube 128, such means including a push rod 150 slidably mounted within the tube 128 and extending out of the far side of the chamber 126. The rod 150 is connected to one end of a crank arm 152 mounted on the frame of the machine by a pivot 154, the opposite end of the crank arm being connected to an armature 156 of a solenoid 158 which, upon activation, moves the armature upwardly to cause the rod 150 to protrude from the tube 128, as shown in Fig. 5.

A spring 160 is arranged between the head block 124 and the crank arm 152 to retract the push rod 150 normally within the tube 128 and away from the end thereof, as shown in Figs. 4 and 6. The solenoid 158 is connected by suitable means for operation by the switch 92 at desired times, as will be described below.

The sequence of operation of the machine may be best understood with reference to Figs. 4, 5 and 6. In Fig. 4 the feed member is shown in its most retracted position. As the cam 100 revolves, the feed member 78 will move toward the holder 22 to engage and pick up the pivot pin 10 within the holder opening 68, as shown in Fig. 5. As the piston portion 79 moves out of the cylinder 76, the effective volume in the cylinder and feed member will, of course, increase. As soon as the end of the extension member 80 engages the pivot pin collar 12, the only available opening for air to enter the piston and cylinder will be closed with the result that a partial vacuum will be created within the feed member 78 and cylinder as the feed member moves out of the cylinder, causing the air pressure to hold or press the pivot pin 10 securely against the extension 80 so that it cannot accidentally be dislodged and will be held in axial alignment on the feed member. As the extension 80 engages the pivot pin positioned in the opening 68 of the holder, it will slide under the pivot pin next above to hold the stack of pins, as shown in Figs. 5 and 6. During the period the feed member is advancing toward the coil 28, the pivot pin positioned within the coil from the previous cycle is being heated. At a predetermined point in the approach of the feed member 78 to the heating coil 28, the cam 88 is arranged to open the switch 94 and the circuit to the heating coil and to close the switch 92 and activate the solenoid 158, whereby the pivot pin within the heating coil will be ejected by the push rod 150, as shown in Fig. 5, the ejected pin falling into the cooling liquid in the pan 30. The solenoid 158 is immediately deactivated and the push rod 150 retracted within the tube 128 by the spring 160, leaving the end of the tube clear to receive the hub 14 of the approaching pivot pin. As has been mentioned above, air is being drawn from the chamber 126 and the tube 128 provides the principal air passage to the chamber. Thus, as the hub 14 of a pivot pin is inserted within the end of the tube 128, this air passage will be closed off, causing a partial vacuum to form in the chamber 126 and tube 128 whereupon the air pressure on the pivot pin collar 12 will press the pivot pin against the end of the tube. As the pivot pin hub is thrust into the tube end, the feed member 78 reaches the position wherein the port 114 opens to atmosphere, causing the vacuum within the feed member 78 and cylinder 76 to break and freeing the pivot pin therefrom. The pivot pin is thus seized and held in the end of the tube 128 and simultaneously released from the feed member 78. The motion of the cam 100 causes immediate retraction of the feed member 78 and as soon as the extension 80 is clear of the holder 22, the pivot pins 10 therein will slide down to position a new pivot pin within the opening 68. When the extension 80 has been retracted far enough from the heating coil 28 so as to not be within the influence thereof, the cam 90 closes the switch 94 to impart energy from the source 121 to the heating coil to heat the pivot pin within the coil aperture. The amount of energy and the period of heating will depend, of course, upon the object being heated and the temperature to which it is desired that it be heated. The foregoing cycle is continually repeated during the operation of the machine.

A machine constructed as illustrated and described is capable of handling and heat treating pivot pins at a high rate of speed.

Having illustrated and described a preferred embodiment of the invention, it should be apparent to those skilled in the art that the invention permits of modification in arrangement and detail. In particular it will be apparent that by providing cooperating surfaces on the ends of the feed and receiving members, objects of various configurations may be similarly handled. We claim as our invention all such modifications as come within the true spirit and scope of the appended claims.

1. A machine for heat treating pivot pins having an enlarged central annular collar and concentric opposite hubs of smaller diameter, said machine comprising a high frequency heating coil arranged about a horizontal axis, a feed member reciprocating coaxially of and to and from said coil, means for positioning a pivot pin to be heat treated in axial alignment with and spaced from said coil in the path of said feed member, said feed member having an opening for receiving a pivot pin hub and supporting the pivot pin thereby as it is moved toward said coil, and means adjacent said coil for sucking a pivot pin from said feed member and supporting the pin within said coil.

2. A machine for heat treating pivot pins having an enlarged central annular collar and concentric hubs of smaller diameter projecting oppositely therefrom, said machine comprising a support member having a horizontally aligned aperture for receiving a pivot pin hub, and a shoulder to engage the collar of the pivot pin, means for holding a pivot pin against said shoulder, means for heating a pivot pin held by said support member, means for ejecting a pivot pin from said support member after a predetermined period of time, means for retaining a supply of pivot pins, and means for feeding said pivot pins from said supply one at a time to said support member.

3. A machine for heat treating pivot pins having an enlarged central annular collar and concentric hubs of smaller diameter projecting oppositely therefrom, said machine comprising a horizontally extending cylindrical tube having an inner diameter intermediate the diameter of said collar and said hubs, a high frequency coil arranged about one end of said tube, vacuum means connected to said tube for drawing a vacuum therein whereby a pivot pin having a hub thrust into said tube one end will be held against the end thereof and within the field of said coil, so as to be heated by the same, and means for ejecting a pivot pin from the end of said tube comprising a push rod mounted in said tube for extension outwardly of and retraction inwardly of said tube one end, and means operatively connected to said push rod to effect periodic reciprocation of the same.

4. A machine for heat treating pivot pins having an enlarged central annular collar and concentric hubs of smaller diameter projecting oppositely therefrom, said machine comprising a horizontally extending cylindrical tube having an inner diameter intermediate the diameter of said collar and said hubs, a high frequency coil arranged about one end of said tube, vacuum means connected to said tube for drawing a vacuum therein whereby a pivot pin having a hub thrust into said tube will be held against the end thereof and within the field of said coil, so as to be heated by the same, means for ejecting a pivot pin from the end of said tube comprising a push rod mounted in said tube for extension outwardly of and retraction inwardly of said tube one end, means operatively connected to said push rod to effect periodic reciprocation of the same, and means operating in timed relation to said push rod for feeding pivot pins one at a time, hub end first, to said tube.

5. A machine for heat treating pivot pins having an enlarged central annular collar and concentric hubs of smaller diameter projecting oppositely therefrom, said machine comprising a horizontally extending circular tube having an inner diameter intermediate the diameter of said collar and said hubs, a high frequency coil arranged about one end of said tube, vacuum means connected to said tube for drawing a vacuum therein whereby a pivot pin having a hub thrust into said tube will be held against the end thereof and within the field of said coil, so as to be heated by the same, a push rod mounted in said tube for extension outwardly of and retraction inwardly of said tube one end, means operatively connected to said push rod to effect periodic reciprocation of the same, means for feeding pivot pins one at a time, hub end first, to said tube including an elongated, cylindrical member mounted for reciprocation coaxially of said tube between a position proximate to said one tube end and a position remote from said one tube end, said member having a coaxial aperture in the end thereof facing said tube end of a diameter slightly greater than the diameter of said pivot pin hubs, means for positioning a pivot pin in coaxial alignment with and between said tube and said member when said member is adjacent its said remote position whereby said member will engage one hub of a pivot pin so positioned upon its approach toward said tube and thrust the opposite hub of the pin into said tube, and means for correlating the reciprocation of said push rod and said member whereby a pivot pin is fed to said tube end when said push rod is retracted within said tube and is held on the end of said tube for a predetermined period of time before it is engaged by said push rod and pushed out of and free of the end of said tube.

6. In a machine for transferring an object from one position to another, a first member having a surface portion formed to engage an object to be transferred and having an aperture in said surface portion closed upon engagement of an object, means for drawing a vacuum in said aperture whereby air pressure will press and hold an engaged object against said surface portion, a receiving member at such another position having a surface portion for engaging an object and having an aperture in said surface portion closed upon engagement of an object thereagainst, means for drawing a vacuum in said last mentioned aperture, means for effecting movement of said first member from said one position toward said receiving member so as to position an object carried on said first member against said receiving member surface portion whereby the object will be sucked against said receiving member, and means for breaking the vacuum in said first member aperture upon engagement of an object with said receiving member.

7. In a machine for handling an object having opposite surface portions, a receiving member formed to receive one of said surface portions, a feed member mounted for reciprocation to and from said receiving member, means to reciprocate said feed member, said feed member having an end facing said receiving member formed to engage the other surface portion of said object, said feed member having an aperture in said end thereof adapted to be sealed upon engagement of said object thereon, means for positioning said object in the path of said feed member with said other object surface facing said feed member, means operatively arranged with said feed member to effect the creation of a vacuum condition in said aperture upon engagement of said feed member with said object whereby said object will be held securely upon said feed member as it is moved toward said receiving member, means to break said vacuum when said object engages said receiving member, and means operatively arranged with said receiving member to hold said object against the end thereof.

8. In a machine for transferring an object from one position to another, means defining a cylinder having a closed end, an elongate tubular piston reciprocally mounted in said cylinder and extending therefrom, the end of said piston protruding from said cylinder being formed for engagement with said object so as substantially to seal off the end of said piston, means for effecting reciprocation of said piston relative to said cylinder, means for positioning said object in the path of said piston whereby upon engagement of said piston end with said object surface, the flow of air into said piston will be stopped to create a partial vacuum therein thus to cause said object to be pressed and held against the end of the piston during the extension thereof.

9. In a machine for transferring an object having a projection from a surface, means defining a cylinder having a closed end, an elongate tubular piston reciprocally mounted in said cylinder and extending therefrom, the end of said piston protruding from said cylinder being formed to surround said projection and abut against a surrounding surface of said object, means for effecting reciprocation of said piston relative to said cylinder, means for positioning said object in the path of said piston with said projection aligned with the opening in said piston end whereby upon engagement of said piston end with said object surface the flow of air into said piston will be stopped to create a partial vacuum therein causing said object to be pressed against the end of the piston, and a port in the wall of said piston positioned to be exposed at the limit of the extension stroke of said piston to cause said vacuum to break and release said object.

10. In a machine for handling an object having an enlarged central portion and opposite projections, a receiving member having an aperture to receive one of said projections, a feed member having an end formed with an aperture to receive the other of said projections, means for reciprocating said feed member to and from said receiving member, means for positioning such an object at a point spaced from said receiving member in the path of said feed member with said projections aligned with the corresponding apertures, whereby said object will be engaged by said feed member as it moves toward said receiving member, means to draw a vacuum in said feed member aperture pressurably to hold said object against the end of said feed member, means to break said vacuum when said object is thrust into said receiving member, and means operatively arranged with said receiving member to pressurably hold said object against the same.

11. In a machine for handling an object having an enlarged central portion and opposite, axially coincident projections, a receiving member having an aperture to receive one of said projections, a feed member having an end formed with an aperture to receive the other of said projections, said apertures being axially coincident, means for reciprocating said feed member to and from said receiving member, means for positioning such an object at a point spaced from said receiving member in the path of said feed member with said projection axially coincident with said apertures, whereby said object will be engaged by said feed member as the feed member moves toward said receiving member, means operatively arranged with said feed member pressurably to hold said object against the end of said feed member, means to release said pressure when said object is thrust into said receiving member, and means operatively arranged with said receiving member pressurably to hold said object against the same.

12. In a machine for handling an object having oppositely facing end portions, a receiving member having an aperture to receive one of said end portions, a feed member positioned in predetermined relation with respect to said receiving member, said feed member having an end formed with an aperture to receive the other end of said end portion, means for reciprocating said feed member to and from said receiving member, means for positioning such an object at a point spaced from said receiving member in the path of said feed member with said end portions facing the corresponding member in alignment with the aperture thereof, whereby said object one end will be engaged in said feed member aperture as said feed member moves toward said receiving member, and means operatively arranged with said receiving member to seize said object when said object other end is thrust into the said aperture thereof.

References Cited in the file of this patent

UNITED STATES PATENTS

| | | |
|---|---|---|
| 1,807,971 | Day | June 2, 1931 |
| 1,993,619 | Neff et al. | Mar. 5, 1935 |
| 2,198,976 | Rober | Apr. 30, 1940 |
| 2,427,712 | Casler et al. | Sept. 23, 1947 |
| 2,604,577 | Strickland et al. | July 22, 1952 |
| 2,647,199 | Wharff | July 28, 1953 |
| 2,714,647 | Good | Aug. 2, 1955 |
| 2,764,799 | McGowan et al. | Oct. 2, 1956 |